(12) United States Patent
Matsumoto

(10) Patent No.: US 9,016,817 B2
(45) Date of Patent: Apr. 28, 2015

(54) PRINTING APPARATUS, PRINTING METHOD AND COMPUTER PROGRAM PRODUCT

(75) Inventor: Hiroshi Matsumoto, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 235 days.

(21) Appl. No.: 13/045,933

(22) Filed: Mar. 11, 2011

(65) Prior Publication Data

US 2011/0227978 A1    Sep. 22, 2011

(30) Foreign Application Priority Data

Mar. 18, 2010 (JP) ................................. 2010-063370

(51) Int. Cl.
B41J 29/38 (2006.01)
G06K 15/10 (2006.01)
G06K 15/02 (2006.01)

(52) U.S. Cl.
CPC ............ G06K 15/10 (2013.01); G06K 15/1863 (2013.01); G06K 15/1868 (2013.01); G06K 15/1894 (2013.01)

(58) Field of Classification Search
USPC ........................................................ 347/9–12
See application file for complete search history.

(56) References Cited

U.S. PATENT DOCUMENTS 5,689,289 A * 11/1997 Watanabe et al. .................. 347/7
6,283,569 B1 * 9/2001 Otsuka et al. .................... 347/15
7,365,865 B2 * 4/2008 Kidani et al. ................ 358/1.13
2003/0193542 A1 * 10/2003 Kasahara ......................... 347/37
2005/0231537 A1 * 10/2005 Momose ........................... 347/9
2010/0079526 A1 * 4/2010 Sanada ............................ 347/14

FOREIGN PATENT DOCUMENTS

JP    09-0207364 A    8/1997
JP    11-042785 A    2/1999
JP    4496098          4/2010

OTHER PUBLICATIONS

Office Action issued Nov. 5, 2013 in Japanese Patent Application No. 2010-063370.

* cited by examiner

Primary Examiner — Jason Uhlenhake
(74) Attorney, Agent, or Firm — Oblon, McClelland, Maier & Neustadt, L.L.P.

(57) ABSTRACT

A printing apparatus that is an inkjet printing apparatus includes a print head that includes a plurality of nozzles that eject liquid droplets, and prints output data onto a recording medium in a plurality of scans, a storage unit including number of storage areas, the number being determined based on a scheme of the scans, an intermediate data generating unit that generates intermediate data corresponding to an image to be output in each of the scans of the print head from input image data, an intermediate data storing processing unit that stores the intermediate data in different storage areas of the storage unit corresponding to the respective scans of the print head, and an output data converting unit that converts the intermediate data stored in the storage unit into the output data, and sends the output data to the print head.

20 Claims, 16 Drawing Sheets

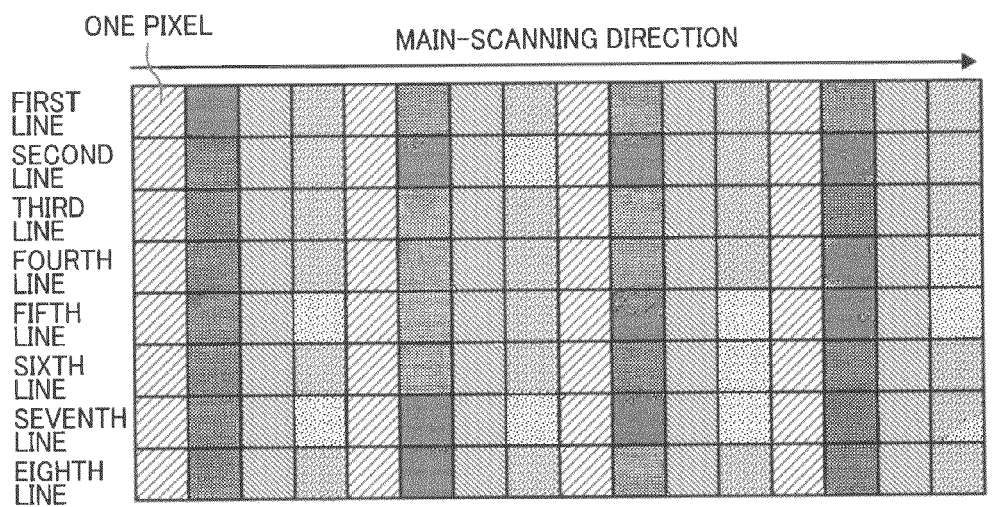

| INTER-LACE | 1:1: DOTS TO BE PRINTED | 2:1: DOTS TO BE PRINTED | 4:1: DOTS TO BE PRINTED |
|---|---|---|---|
| FIRST SCAN | RED, BLUE, LIGHT BLUE, GREEN | RED, LIGHT BLUE | RED |
| SECOND SCAN | RED, BLUE, LIGHT BLUE, GREEN | BLUE, GREEN | LIGHT BLUE |
| THIRD SCAN | RED, BLUE, LIGHT BLUE, GREEN | RED, LIGHT BLUE | BLUE |
| FOURTH SCAN | RED, BLUE, LIGHT BLUE, GREEN | BLUE, GREEN | GREEN |

NORMAL MODE

MAIN-SCANNING DIRECTION

ONE PASS AND 2:1 INTERLACE

MAIN-SCANNING DIRECTION

TWO PASS AND 2:1 INTERLACE

MAIN-SCANNING DIRECTION

FOUR PASS AND 2:1 INTERLACE

MAIN-SCANNING DIRECTION

| 1 | 5 | 3 | 7 |
|---|---|---|---|
| 6 | 2 | 8 | 4 |
| 1 | 5 | 3 | 7 |
| 6 | 2 | 8 | 4 |

FOUR PASS AND 4:1 INTERLACE

MAIN-SCANNING DIRECTION

| 1 | 5 | 9 | 13 |
|---|---|---|---|
| 12 | 16 | 4 | 8 |
| 3 | 7 | 11 | 15 |
| 10 | 14 | 2 | 6 |

INTERMEDIATE DATA STORAGE AREA

IMAGE CONVERTED FOR OUTWARD PRINTING

IMAGE CONVERTED FOR INWARD PRINTING

PRINTING APPARATUS, PRINTING METHOD AND COMPUTER PROGRAM PRODUCT

CROSS-REFERENCE TO RELATED APPLICATIONS

The present application claims priority to and incorporates by reference the entire contents of Japanese Patent Application No. 2010-063370 filed in Japan on Mar. 18, 2010.

BACKGROUND OF THE INVENTION

1. Field of the Invention

The present invention relates to a printing apparatus, a printing method, and a computer program.

2. Description of the Related Art

An inkjet printer performs a rendering process in which input image data is converted into output image data, while the print head of the inkjet printer performs scanning along the main-scanning direction. Such a rendering process, however, requires a long time. In particular, when an A0-sized image is to be printed, the rendering process takes longer time than when an A4-sized image is printed. Recently, there is an increasing demand for a higher linear velocity in large-sized printers which is capable of printing A0-sized images. Therefore, it is desirable that the rendering process be performed in higher speed.

To improve printing quality, an inkjet printer performs printing in multi-pass print mode, in which the head scans a target a plurality of times to finish printing of a single image in the main-scanning direction, or interlaced print mode, in which the head scans the target a plurality of times to finish printing of a single image in the sub-scanning direction. The extended length of time required in the rendering process becomes more prominent when the multi-pass print mode or the interlaced print mode is selected.

Thus, in one known conventional technology, an image is compressed to data of such an amount that can be output by scanning the target with the print head only once. This data is stored in a memory as intermediate data. Thus, the amount of image data to be processed is reduced and the time required for rendering is also reduced.

In addition, Japanese Patent Application Laid-open No. 2006-209458 discloses a technology for realizing a high speed rendering process. According to this technology, effective data is read out from an input image data stored in a memory in an interlacing process, and only the effective data is packed in an intermediate data generating process.

However, in such conventional technologies, when a printing process is performed in the multi-pass print mode, some data is lost during image compression, which is performed for generating the data to be output in a scanning by one print head. This lost data, however, needs to be read out again from the memory for generating data to be output in a scanning by another print head. More specifically, the input image data stored in one memory area is read out, and the read-out data is compressed to 1/(the number of passes). The compressed data, i.e., intermediate data is stored in another memory area. The data lost in the compression, i.e., a part of the input image data is required for generating the data to be output in the scanning by another print head. Hence, for generating the data to be output in the scanning by this another print head, the same input image data has to be read out again. Thus, the speed of rendering process lowers.

In the technology according to Japanese Patent Application Laid-open No. 2006-209458 as well, the input image data has to be read more than one time, thus reducing the processing speed of the rendering process.

SUMMARY OF THE INVENTION

It is an object of the present invention to at least partially solve the problems in the conventional technology.

According to one aspect of the present invention, a printing apparatus that is an inkjet printing apparatus includes a print head that includes a plurality of nozzles that eject liquid droplets, and prints output data onto a recording medium in a plurality of scans, a storage unit including number of storage areas, the number being determined based on a scheme of the scans, an intermediate data generating unit that generates intermediate data corresponding to an image to be output in each of the scans of the print head from input image data, an intermediate data storing processing unit that stores the intermediate data in different storage areas of the storage unit corresponding to the respective scans of the print head, and an output data converting unit that converts the intermediate data stored in the storage unit into the output data, and sends the output data to the print head.

According to another aspect of the present invention, a printing method executed in an inkjet printing apparatus comprising a print head including a plurality of nozzles that eject liquid droplets and prints output data onto a recording medium in a plurality of scans, and a storage unit including number of storage areas, the number being determined based on a scheme of the scans, the method includes generating intermediate data corresponding to an image to be output in each of the scans of the print head from input image data, storing the intermediate data in different storage areas of the storage unit corresponding to the respective scans of the print head, and converting the intermediate data stored in the storage unit into the output data, and sending the output data to the print head.

According to still another aspect of the present invention, a computer program product comprising a non-transitory computer-usable medium having computer-readable program codes embodied in the medium for causing a computer including a print head with a plurality of nozzles that eject liquid droplets and prints output data onto a recording medium in a plurality of scans, and a storage unit with a number of storage areas, the number being determined based on a scheme of the scans to execute: generating intermediate data corresponding to an image to be output in each of the scans of the print head from input image data; storing the intermediate data in different storage areas of the storage unit corresponding to the respective scans of the print head; and converting the intermediate data stored in the storage unit into the output data, and sending the output data to the print head.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIGS. 5A and 5B are schematics for explaining how printing is performed in a multi-pass print mode;

DETAILED DESCRIPTION OF THE PREFERRED EMBODIMENTS

An embodiment of a printing apparatus, a printing method, and a computer program product according to the present invention is described below in greater detail with reference to the accompanying drawings. In the embodiment, an inkjet printer is used as the printing apparatus.

Figure 1:
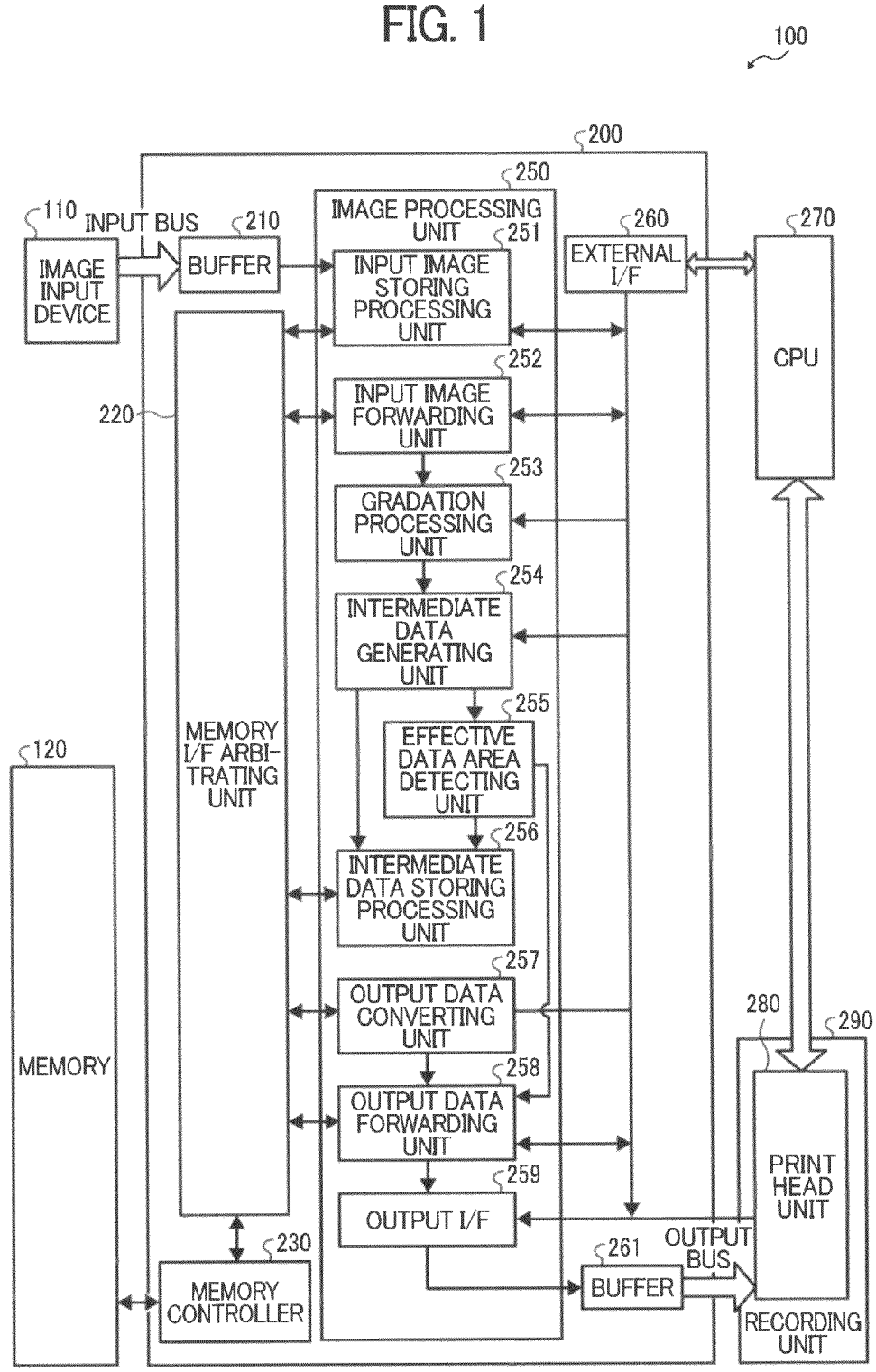
FIG. 1 is a block diagram of a functional configuration of a printer according to an embodiment of the present invention.

FIG. 1 is a block diagram of a functional configuration of a printer according to the embodiment. A printer 100 according to the embodiment mainly includes, as illustrated in FIG. 1, an image processor 200, a memory 120, a central processing unit (CPU) 270, and a print head unit 280.

The printer 100 according to the embodiment is connected to an image input device 110 via an input bus. The image input device 110 is an external device such as a computer or a controller board, and the printer 100 receives input image data for printing from the image input device 110, and stores the data in a buffer 210.

The CPU 270 sets print mode, image processing parameters, and the like to an image processing unit 250 via an external interface (I/F) 260, and receives notification of an effective data area from the image processing unit 250. The CPU 270 also performs printing control for the print head unit 280.

A recording unit 290 includes the print head unit 280. The print head unit 280 prints head output data within an effective data area onto a recording sheet by ejecting ink droplets thereto. The head output data is obtained by converting the input image data for printing. The print head unit 280 is controlled by the CPU 270 and scans the recording sheet to print in any one of the multi-pass print mode, the interlaced print mode, the normal mode, or any combination thereof.

The image processor 200 mainly includes, as illustrated in FIG. 1, the buffer 210 and a buffer 261, a memory I/F arbitrating unit 220, a memory controller 230, the image processing unit 250, and the external I/F 260.

The image processing unit 250 is a functional unit mounted on an application-specific integrated circuit (ASIC) and the like, and performs a rendering process. In the rendering process, input image data received from the image input device 110 via the input bus and stored in the buffer 210 is converted into output data. The image processing unit 250 further writes the output data generated in the rendering process into the buffer 261, and outputs the output data to the print head unit 280 via an output bus. Here, the "output data" corresponds to an image which is printed by one scanning action by the print head unit 280 in the main-scanning direction.

The image processing unit 250 mainly includes, as illustrated in FIG. 1, an input image storing processing unit 251, an input image forwarding unit 252, a gradation processing unit 253, an intermediate data generating unit 254, an effective data area detecting unit 255, an intermediate data storing processing unit 256, an output data converting unit 257, an output data forwarding unit 258, and an output I/F 259.

The input image storing processing unit 251 stores the input image data stored in the buffer 210 in the memory 120 via the memory I/F arbitrating unit 220 and the memory controller 230. The input image forwarding unit 252 reads out the input image data stored in the memory 120 via the memory controller 230 and the memory I/F arbitrating unit 220.

The gradation processing unit 253 performs a γ process, a droplet amount reducing process, and the like to the input image data read out from the memory 120, as well as converts the input image data into smaller-sized data using a multilevel error diffusion method and the like.

The intermediate data generating unit 254 generates intermediate data from the input image data after application of the gradation process. The intermediate data storing processing unit 256 stores the intermediate data thus generated in the memory 120 via the memory I/F arbitrating unit 220 and the memory controller 230.

The effective data area detecting unit 255 detects the effective data area in the intermediate data.

The output data converting unit 257 reads out the intermediate data stored in the memory 120, and converts the intermediate data into the output data. The output data forwarding unit 258 writes the output data into the buffer 261 via the output I/F 259. In this manner, the output data is sent out to the print head unit 280. Further, the output data forwarding unit 258 notifies the effective data area detected by the effective data area detecting unit 255 to the CPU 270 via the external I/F 260.

The functions of the intermediate data generating unit 254, the intermediate data storing processing unit 256, and the effective data area detecting unit 255 will be explained later in detail.

Figure 2:
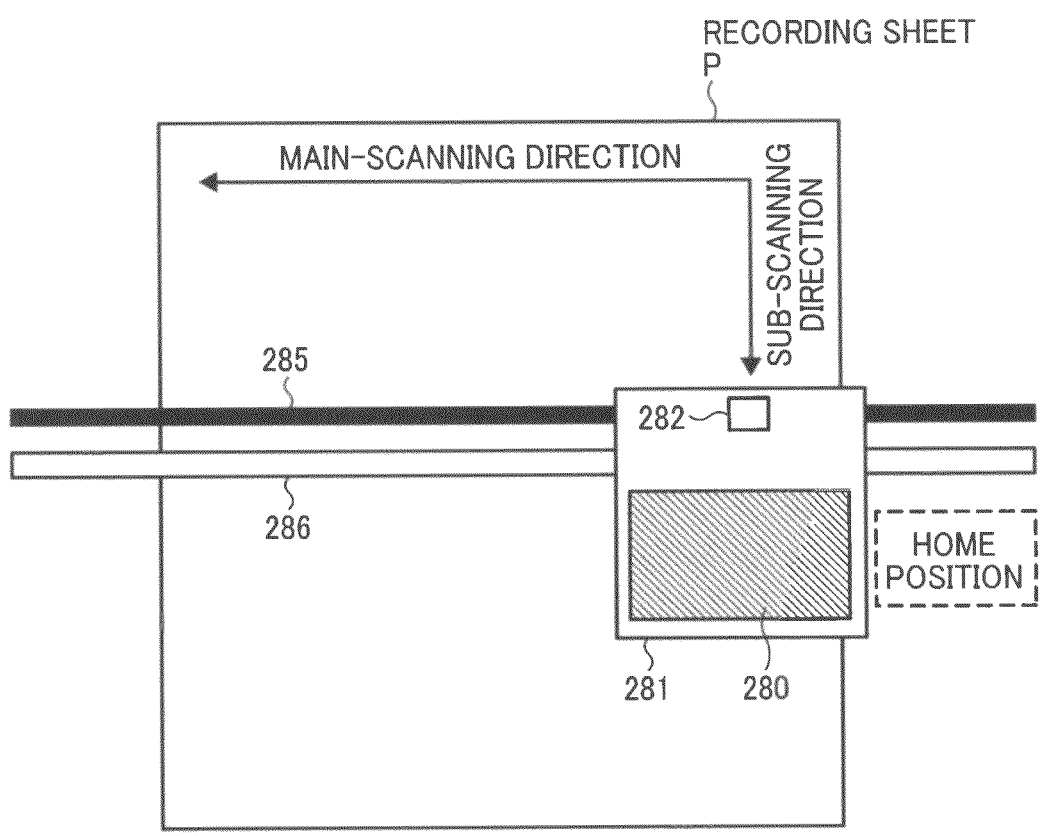
FIG. 2 is a detailed schematic of a structure of a recording unit.

The recording unit 290 will now be explained in detail. FIG. 2 is a detailed schematic of a structure of the recording unit 290. The recording unit 290 includes, as illustrated in FIG. 2, the print head unit 280, a carriage 281, a main-scanning encoder sensor 282, a main-scanning encoder sheet 285, and a guide rod 286.

The print head unit 280 includes a print head having nozzles for ejecting color ink in one of four colors, black (K), cyan (C), magenta (M), and yellow (Y), and a print head controller board (none of which are illustrated).

The carriage 281 moves the print head along the guide rod 286 in the main-scanning direction, and is kept at a home position in a stand-by status.

The main-scanning encoder sensor 282 reads the main-scanning encoder sheet 285, and transmits a signal at a constant interval corresponding to the movement of the carriage 281 in the main-scanning direction.

To record data, the carriage 281 at the home position is moved to carry the print head, allowing the print head to scan a recording sheet P in the main-scanning direction while ejecting ink onto the recording sheet P via the nozzles.

For unidirectional printing, once the print head completes recording up to an edge of the recording sheet P, the recording sheet P is carried in the sub-scanning direction, the carriage 281 is returned to the home position, and the print head is caused to record data again while scanning in the main-scanning direction. For bidirectional printing, the print head starts recording from the point where the previous movement is stopped, while scanning in the reverse direction of the main-scanning direction.

As the carriage 281 causes the print head to scan in the main-scanning direction, the print head controller board receives signals from the main-scanning encoder sensor 282, and counts the number of receptions to recognize the position of the carriage 281 in the main-scanning direction. The print head controller board obtains the output data output from the image processing unit 250 corresponding to the position in the main-scanning direction, and causes the print head to eject ink via the nozzles. Printing is achieved by repeating these processes of carrying the recording sheet P and scanning using the carriage 281.

The image processing unit 250 has to output the output data to the print head unit 280 in synchronization with the movement of the carriage 281 in the main-scanning direction. The image processing unit 250 generates intermediate data in order to output only the image data to be recorded on the recording sheet P during the pertinent scan (i.e., during one movement cycle of the carriage 281).

Figure 3:
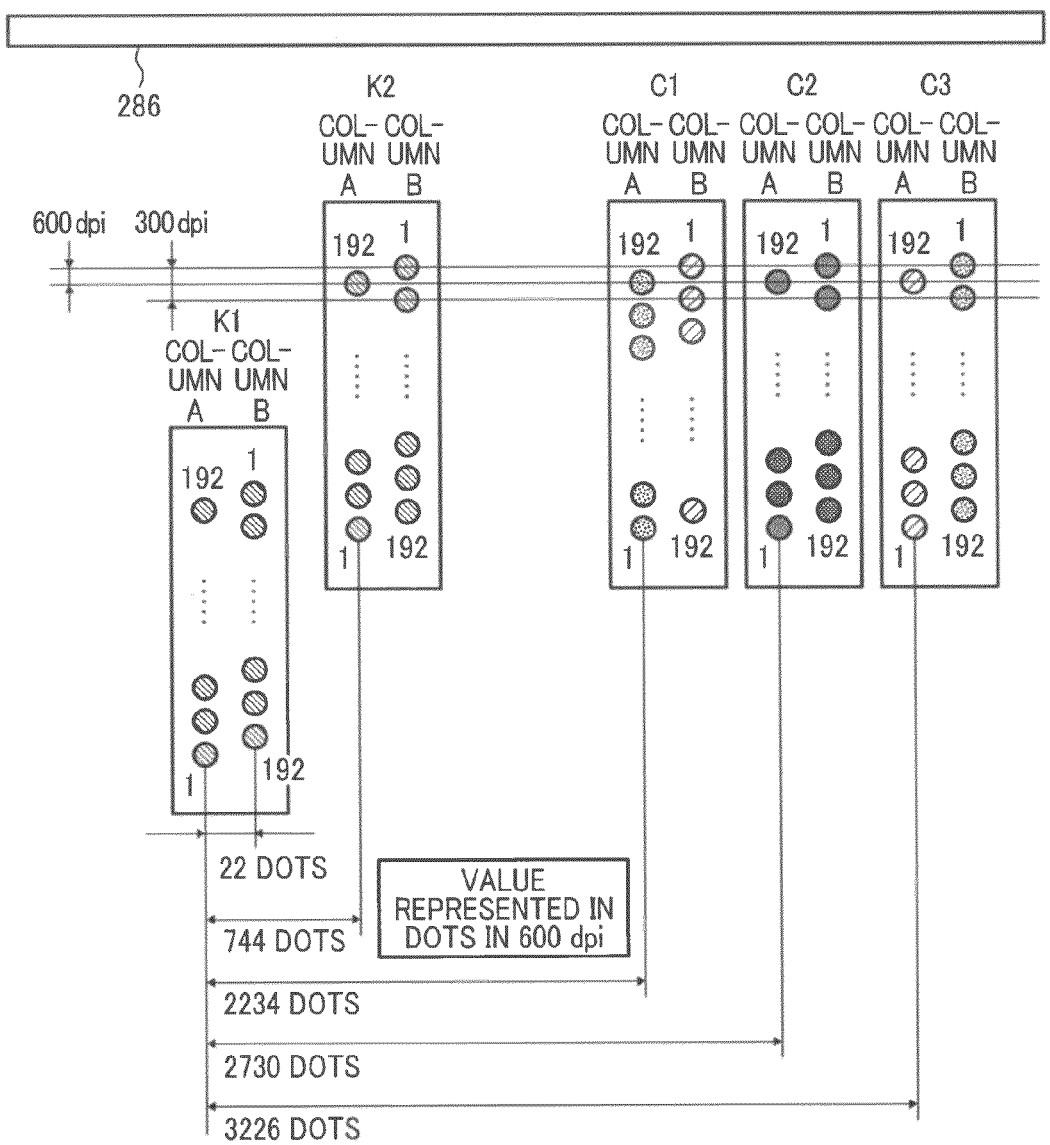
FIG. 3 is a schematic of an exemplary structure of a print head.

FIG. 3 is a schematic of an exemplary structure of the print head. The print head includes, as illustrated in FIG. 3, a head K1 and a head K2 for the color K, and a head C1, a head C2, and a head C3 for the colors C, M, and Y. When the printing is performed only with the color K, the head K1 and the head K2 are used. When four-color printing is performed in the colors C, M, Y, and K, four heads, the head K1, the head C1, the head C2, and the head C3, or the head K2, the head C1, the head C2, and the head C3 are used.

On each of these heads, nozzles are arranged in two columns, a column A and a column B. Each of the columns includes 192 nozzles. In other words, each of the head C1, the head C2, and the head C3 includes 384 nozzles arranged in two columns, and the head K1 and the head K2 include 768 nozzles in total arranged in four columns.

The nozzles in each of the columns are arranged at intervals of 300 dpi along the sub-scanning direction. A nozzle in the column A and a nozzle in the column B on each of the heads are disposed at positions offset from each other by 600 dpi in the sub-scanning direction. Furthermore, a nozzle in the column A and a nozzle in the column B on each of the heads are disposed at an interval of 22 dots (converted with 600 dpi) in the main-scanning direction.

Each of the heads are arranged with a distance of 744 dots between the head K1 and the head K2, a distance of 2234 dots between the head K1 and the head C1, a distance of 2730 dots between the head K1 and the head C2, and a distance of 3226 dots between the head K1 and the head C3.

Figure 4:
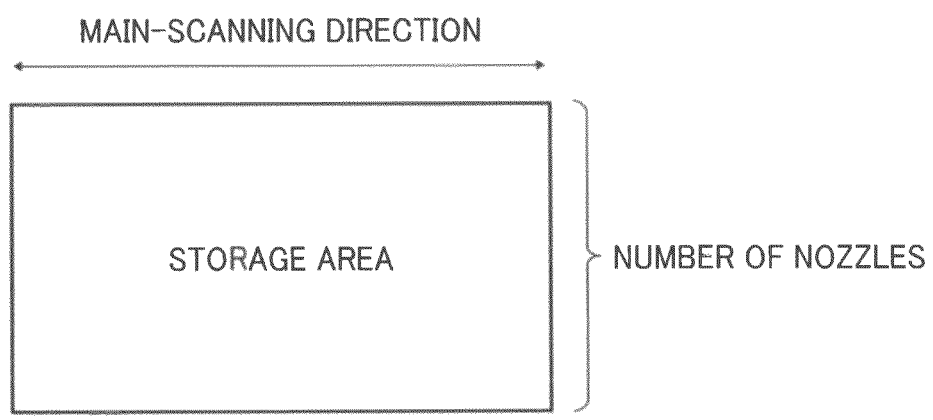
FIG. 4 is a schematic of a storage area to be reserved in a memory.

A storage area to be reserved in the memory 120 will now be explained. FIG. 4 is a schematic of a storage area to be reserved in the memory 120. This storage area is used for storing therein the intermediate data that is generated by the intermediate data storing processing unit 256 during the process of generating the output data. A number of storage areas corresponding to the number of scan patterns are reserved by the intermediate data storing processing unit 256 in the memory 120. The number of scan patterns varies depending on the number of passes and/or the interlace ratio of the print mode. A storage area is also used for storing therein input image data to be recorded by a single scan of the print head on the recording sheet. Therefore, as illustrated in FIG. 4, each of the storage areas has a size corresponding to the number of sub-scanning lines that equals to the number of nozzles on a print head corresponding to the input image data to be stored therein. Each sub-scanning position in a storage area is in a one-to-one correspondence with the position of a nozzle on the print head.

A multi-pass print mode used in the printer 100 according to the embodiment will now be explained. The multi-pass print mode is a print mode in which the print head scans a plurality of number of times to print the output data in the main-scanning direction. Nozzles on the print head are different in their ejecting angle and the droplet (dot) size from each other. When the multi-pass print mode is employed, various nozzles are used in printing. Therefore, uneven density is reduced and image quality can be improved.

FIGS. 5A and 5B are schematics for explaining how printing is performed in the multi-pass print mode. When input image data illustrated in FIG. 5A is printed in the normal mode, and not in the multi-pass print mode, an image in the main-scanning direction is completed by a single scan of the print head. Therefore, when the input image data illustrated in FIG. 5A is printed in the normal mode, the pixels represented in red, blue, light blue, and green are all printed during one scanning as indicated in FIG. 5B (this is referred to as a "one pass" in FIG. 5B).

In the printing using a two-pass print mode, the image in the main-scanning direction is completed by two scans of the print head. Therefore, when the input image data illustrated in FIG. 5A is printed in the two-pass print mode, the pixels represented in red and light blue are printed in the first scan, and the pixels in blue and green are printed in the second scan as indicated in FIG. 5B.

In the printing using a four-pass print mode, the image in the main-scanning direction is completed by four scans of the print head. Therefore, when the input image data illustrated in FIG. 5A is printed in the four-pass print mode, the pixels represented in red are printed in the first scan, the pixels in light blue are printed in the second scan, the pixels in blue are printed in the third scan, and the pixels in green are printed in the fourth scan as indicated in FIG. 5B.

In the above, "two-pass" and "four-pass" represent the number of passes in the multi-pass print mode.

The interlaced print mode used in the printer 100 according to the embodiment will now be explained. The interlaced print mode is a print mode in which the print head scans a plurality of number of times to print a piece of output data in the sub-scanning direction. The resolution in the sub-scanning direction is determined by a nozzle interval on the print head; however, when printing is performed in the interlaced print mode, because an additional dot is formed between two dots, the resolution in the sub-scanning direction is improved to improve the image quality.

Figures 6A, 6B:
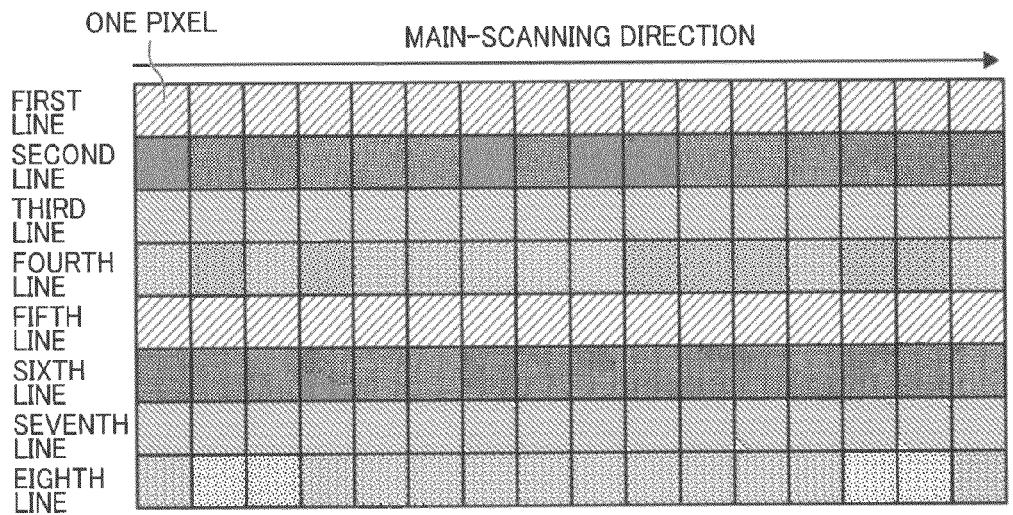
FIGS. 6A and 6B are schematics for explaining how printing is performed in an interlaced print mode.

FIGS. 6A and 6B are schematics for explaining how printing is performed in the interlaced print mode. When input image data illustrated in FIG. 6A is printed in the normal mode, and not in the interlaced print mode, an image in the sub-scanning direction is completed by a single scan of the print head. Therefore, when the input image data illustrated in FIG. 6A is printed in the normal mode, the pixels represented in red, blue, light blue, and green are printed altogether at once as indicated in FIG. 6B (this is referred to as a "1:1" interlace in FIG. 6B).

In the printing using the 2:1 interlaced print mode, the image in the sub-scanning direction is completed by two scans of the print head. Therefore, when the input image data illustrated in FIG. 6A is printed in the 2:1 interlaced print mode, the pixels represented in red and light blue are printed in the first scan, and the pixels in blue and green are printed in the second scan as indicated in FIG. 6B.

In the printing using the 4:1 interlaced print mode, the image in the sub-scanning direction is completed by four scans of the print head. Therefore, when the input image data illustrated in FIG. 6A is printed in the 4:1 interlaced print mode, the pixels represented in red are printed in the first scan, the pixels in light blue are printed in the second scan, the pixels in blue are printed in the third scan, and the pixels in green are printed in the fourth scan as indicated in FIG. 6B.

The interlace ratios in the interlaced print mode are represented as 2:1 interlace, 4:1 interlace, and so on.

FIGS. 7A to 7E are schematics for explaining printing sequences in the normal mode, and in a combination of the multi-pass print mode and the interlaced print mode.

Figure 7A:
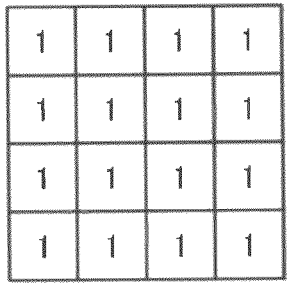
FIGS. 7A to 7E are schematics for explaining printing sequences in the normal mode, and in a combination of the multi-pass print mode and the interlaced print mode.
Figure 7B:
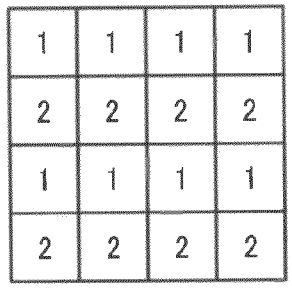
Figure 7C:
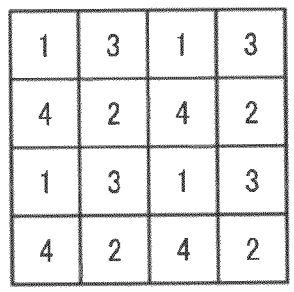
Figure 7D:
Figure 7E:
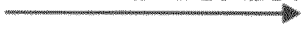

FIG. 7A represents a printing sequence in the normal mode (one pass and 1:1 interlace). FIG. 7B represents a printing sequence in a combination of the normal mode (one pass) and the 2:1 interlaced print mode. FIG. 7C represents a printing sequence in a combination of the two-pass print mode and the 2:1 interlaced print mode. FIG. 7D represents a printing sequence in a combination of the four-pass print mode and the 2:1 interlaced print mode. FIG. 7E represents a printing sequence in a combination of the four-pass print mode and the 4:1 interlaced print mode.

The numbers in these drawings represent an order of the scans of the print head. Image data is formed following the pattern illustrated in FIGS. 7A to 7E depending on the combination of the multi-pass print mode and the interlaced print mode.

On the printer 100, the printing scheme is set in the initial setting in advance. For example, in the initial setting, the normal mode, the multi-pass print mode and the number of passes, and the interlaced print mode and the interlace ratio are specified. The specified print mode (i.e., the normal mode, the multi-pass print mode and the interlaced print mode), the number of passes and the interlace ratio are stored as the printing scheme in a storage medium such as the memory 120.

A process of generating intermediate data performed by the intermediate data generating unit 254 and a process of storing the intermediate data in the memory 120 performed by the intermediate data storing processing unit 256 will now be explained in detail.

Figure 8:
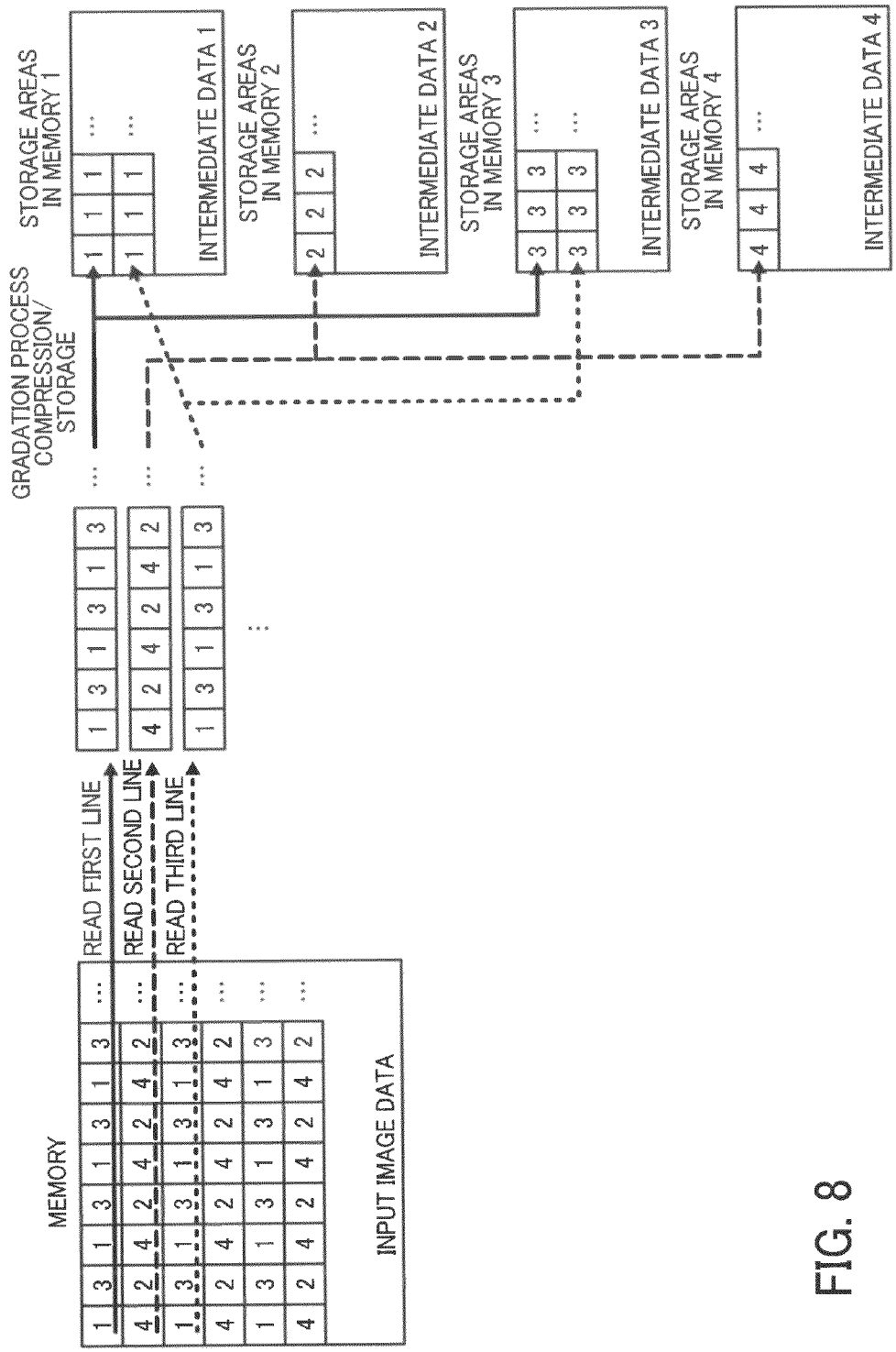
FIG. 8 is a schematic of a series of processes from generating intermediate data from the input image data stored in the memory to storing the intermediate data in the memory.

FIG. 8 is a schematic of a series of processes from generating intermediate data from the input image data stored in the memory 120 to storing the intermediate data in the memory 120. In the example illustrated in FIG. 8, the combination of the two-pass print mode and the 2:1 interlaced print mode is set as a printing scheme.

As illustrated in FIGS. 7A to 7E, a different print head scans/prints each pixel at different timing depending on the position of the pixel in the input image data and depending on the printing sequence.

In the embodiment, the intermediate data corresponding to the output data, whose image is printed via more than one time of scanning by the print head, is generated at one time.

More specifically, the intermediate data generating unit 254 obtains the printing scheme (the print mode, the number of passes, and the interlace ratio) stored in the memory 120. The intermediate data generating unit 254 then reads out the input image data from the memory 120, one line at a time starting from the line at the top, and generates intermediate data from the input image data by performing compression, for example.

The intermediate data storing processing unit 256 determines which pixel should be printed in which scan in the main-scanning direction and in which scan in the sub-scanning direction based on the number of passes and the interlace ratio specified in the printing scheme obtained from the memory 120 and the position of each pixel in the input image data. The intermediate data storing processing unit 256 then classifies and stores the pixels in different storage areas in the memory 120 corresponding to respective scans of the print head.

The number of storage areas in the memory 120 may vary depending on the printing scheme. The intermediate data storing processing unit 256 reserves a predetermined number of storage areas corresponding to the number of scanning patterns, the number of passes and the interlace ratio of the pertinent printing scheme.

An example illustrated in FIG. 8 is explained. In FIG. 8, multi-pass print mode of two passes is set as the printing scheme. Hence, the print head scans twice in the main-scanning direction to scan/print each line of an image corresponding to the input image data. Further, the interlaced print mode with the interlace ratio 1:2 is set as the printing scheme in the example of FIG. 8. Hence, the print head scans twice in the sub-scanning direction to scan/print the image corresponding to the input image data in the sub-scanning direction.

Therefore, after the intermediate data generating unit 254 reads out the input image data from the storage area of the memory 120 and generates the intermediate data, the intermediate data storing processing unit 256 reserves four storage areas, i.e., storage areas 1 to 4 depicted in FIG. 8.

The intermediate data storing processing unit 256 then determines that the pixels in the odd-numbered positions from the head of each line along the main-scanning direction in the input image data are those that are to be printed in the first scan of the print head in the main-scanning direction (pixels "1" and "4" in FIG. 8), and determines that the pixels in the even-numbered positions are those that are to be printed in the second scan of the print head in the main-scanning direction (pixels "3" and "2" in FIG. 8).

In addition, the intermediate data storing processing unit 256 determines that the pixels in the odd-numbered positions from the head of each column along the sub-scanning direction in the input image data are those to be printed in the first scan of the print head in the sub-scanning direction (pixels "1" and "3" in FIG. 8), and determines that the pixels in even-numbered positions are those to be printed in the second scan of the print head in the sub-scanning direction (pixels "4" and "2" in FIG. 8). The pixels are printed in the order of "1", "2", "3", and "4" in different scans of the print head.

Therefore, the intermediate data storing processing unit 256 according to the embodiment stores intermediate data for each of these pixels in the different storage areas 1 to 4 corresponding to the scans "1", "2", "3", and "4" of the print head.

Figure 9:
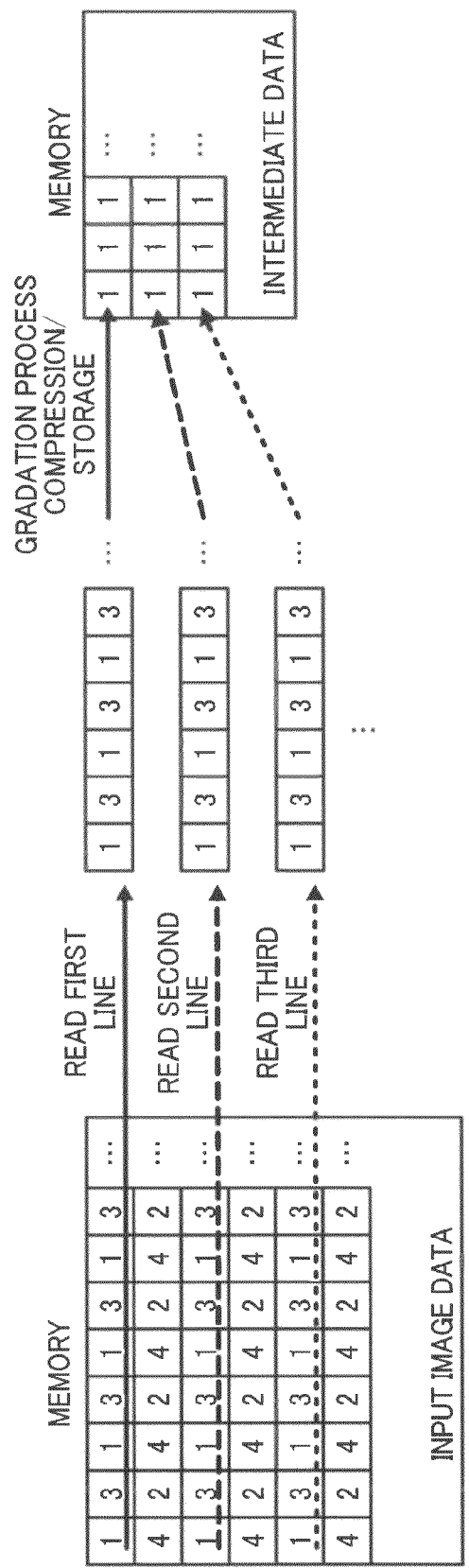
FIG. 9 is a schematic of an outline of a conventional process of generating intermediate data for output data to be printed in a first scan.

On the contrary, in the conventional technology, the intermediate data is generated and stored in the memory only for image data to be printed in a particular single scan of the print head. FIG. 9 is a schematic of a conventional technique for generating intermediate data of the output data printed in a first scan. In the conventional technology, as illustrated in FIG. 9, the pixels in the lines containing output data printed in the first scan of the print head are read, the data for the first scan is compressed in the main-scanning direction to generate the intermediate data, and the intermediate data is stored in the memory. These processes are repeated by the number of times corresponding to the number of pieces of output data printed in a single scan of the print head, and the intermediate data is generated for the data to be printed in the next scan of the print head. Therefore, as the number of scans of the print head increases, the intermediate data generating process and the memory storing process are repeated in an increased number of times. As a result, the processing time required for rendering increases as well.

In the embodiment, unlike the conventional technology, the intermediate data of the output data, which is printed via more than one time of scanning by the print head, is generated concurrently. In addition, the intermediate data corresponding to one scanning operation is stored in a different storage area from the area where the intermediate data corresponding to another scanning operation is stored. Therefore, the processing time for rendering can be reduced significantly.

Figure 10:
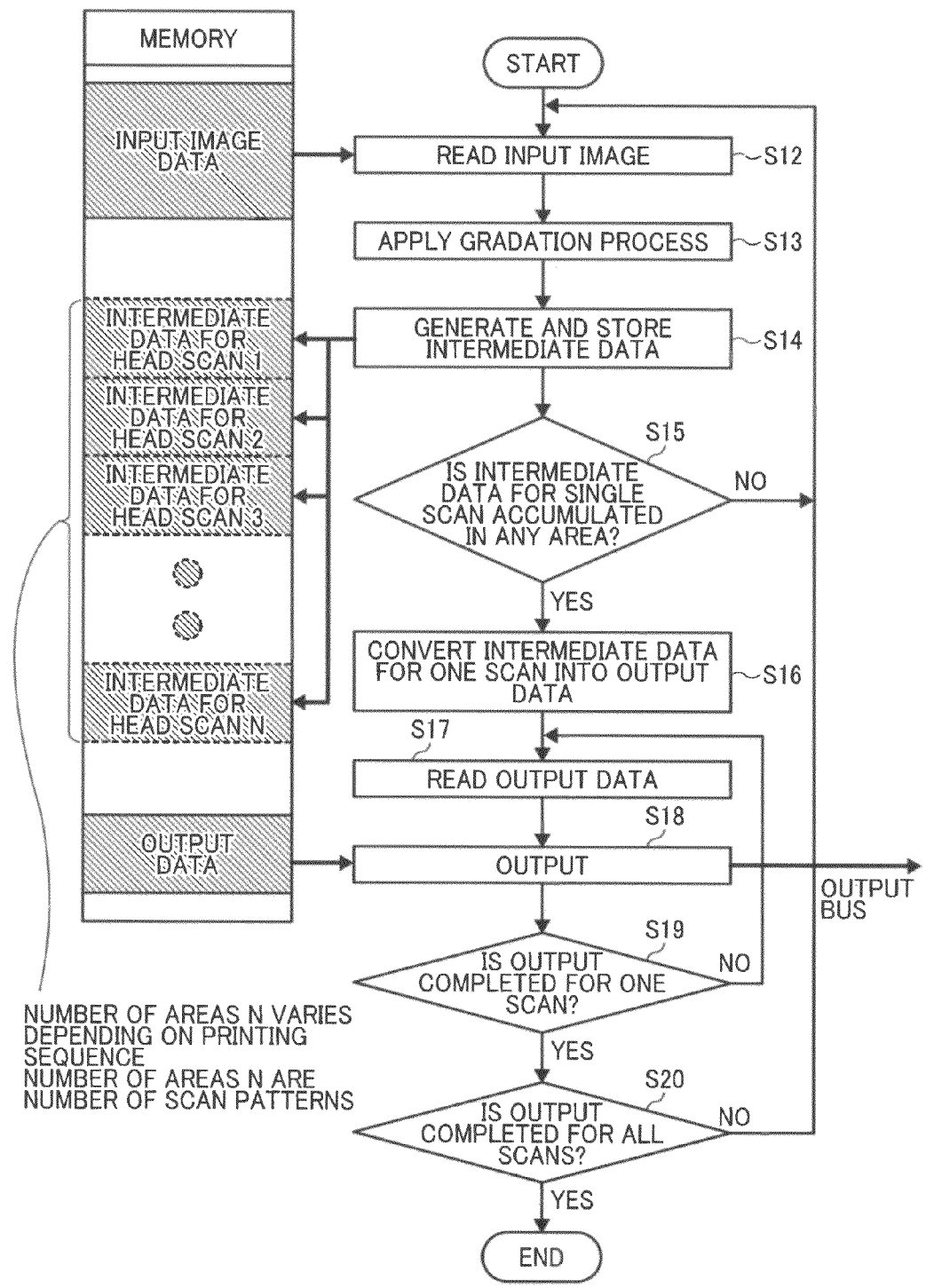
FIG. 10 is a flowchart of a process of generating and storing the intermediate data, and generating output data, and a schematic of a memory storing therein such data.

FIG. 10 is a flowchart of a process of generating and storing the intermediate data, and generating output data, and a schematic of the memory 120 storing therein such data.

To begin with, the intermediate data generating unit 254 reads the input image data stored in the storage area in the memory 120 (Step S12). The gradation processing unit 253 then performs a gradation process to the input image data thus read (Step S13).

After the gradation process, the intermediate data generating unit 254 compresses the input image data to generate intermediate data. Then, the intermediate data storing processing unit 256 stores the intermediate data in its corresponding storage area depending on the scanning order of the print head (Step S14).

In other words, as explained earlier, the intermediate data storing processing unit 256 determines, for each pixel in the input image data, in which scan of the print head the pixel is to be printed based on the printing scheme and the position of the pixel in the input image data, and stores the intermediate data for each pixel in a storage area in the memory 120 corresponding to the scan.

The intermediate data storing processing unit 256 then determines if intermediate data corresponding to a single scan has been accumulated in any of the storage areas (Step S15). If not (No at Step S15), the processes at Steps S12 to S14 are repeated.

On the contrary, if intermediate data corresponding to a single scan has been accumulated in any of the storage areas (Yes at Step S15), the output data converting unit 257 converts the intermediate data corresponding to a single scan into output data, and stores the output data in the memory 120 (Step S16). The output data forwarding unit 258 then reads the output data from the memory 120 (Step S17), and outputs the output data to the buffer 261 via the output I/F 259 (Step S18). In this manner, the output data is sent out to the print head unit 280 via the output bus.

The output data forwarding unit 258 then determines if the output data corresponding to a single scan has been output (Step S19). If the output data corresponding to a single scan has not yet been output (No at Step S19), the processes at Steps S17 and S18 are repeated.

On the contrary, if the output data corresponding to a single scan has been output (Yes at Step S19), the output data forwarding unit 258 further determines if output of the output data has been completed for all of the scans (Step S20). If the output has not been completed yet (No at Step S20), the processes at Steps S12 to S19 are repeated.

On the contrary, if output of the output data has been completed for all of the scans (Yes at Step S20), the process is ended.

Figure 11:
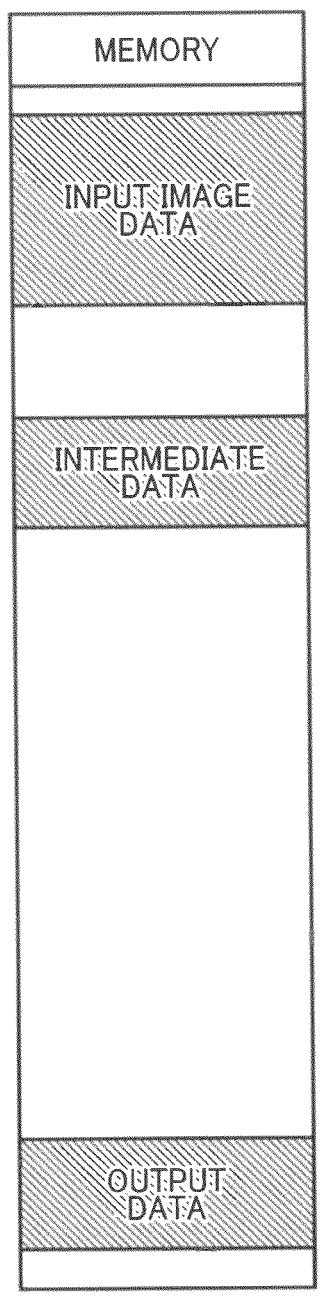
FIG. 11 is a schematic of a memory storing therein conventional intermediate data.

In contrast, in the conventional technology, the data to be printed in a particular scan alone is compressed and stored in the memory to generate and store the intermediate data. FIG. 11 is a schematic of the memory storing therein the conventional intermediate data. Because these processes are repeated until the intermediate data is accumulated for the data to be printed in a single scan of the head, the rendering processing requires a long time.

In the embodiment, as explained above, the intermediate data storing processing unit 256 determines in which scan of the print head each pixel in the input image data is to be printed based on the printing scheme and the position of the pixel in the input image data, and pixels in the intermediate data are stored in different storage areas in the memory 120 corresponding to the scans. Therefore, the number of times the input image data is read from the memory 120 and forwarded is reduced to 1/(number of passes), and in this manner, the processing speed of the rendering process is improved.

Furthermore, the input image data is no longer required to be maintained for the purpose of intermediate data generation. If the input image data is not maintained, reading and forwarding of input data corresponding to a single frame are no longer required, and the processing speed is further improved.

In addition, the memory 120 has a plurality of storage areas each of which corresponds to one scan of the print head, and the lines in the storage areas is in one-to-one correspondence with the positions of the nozzles along the sub-scanning direction. Thus, if a certain nozzle becomes incapable of ejecting ink due to clogging, for example, the intermediate data can be copied to another area corresponding to another scan. In this manner, the printing can be compensated easily by a nozzle output performed in such a scan.

Figure 12A:
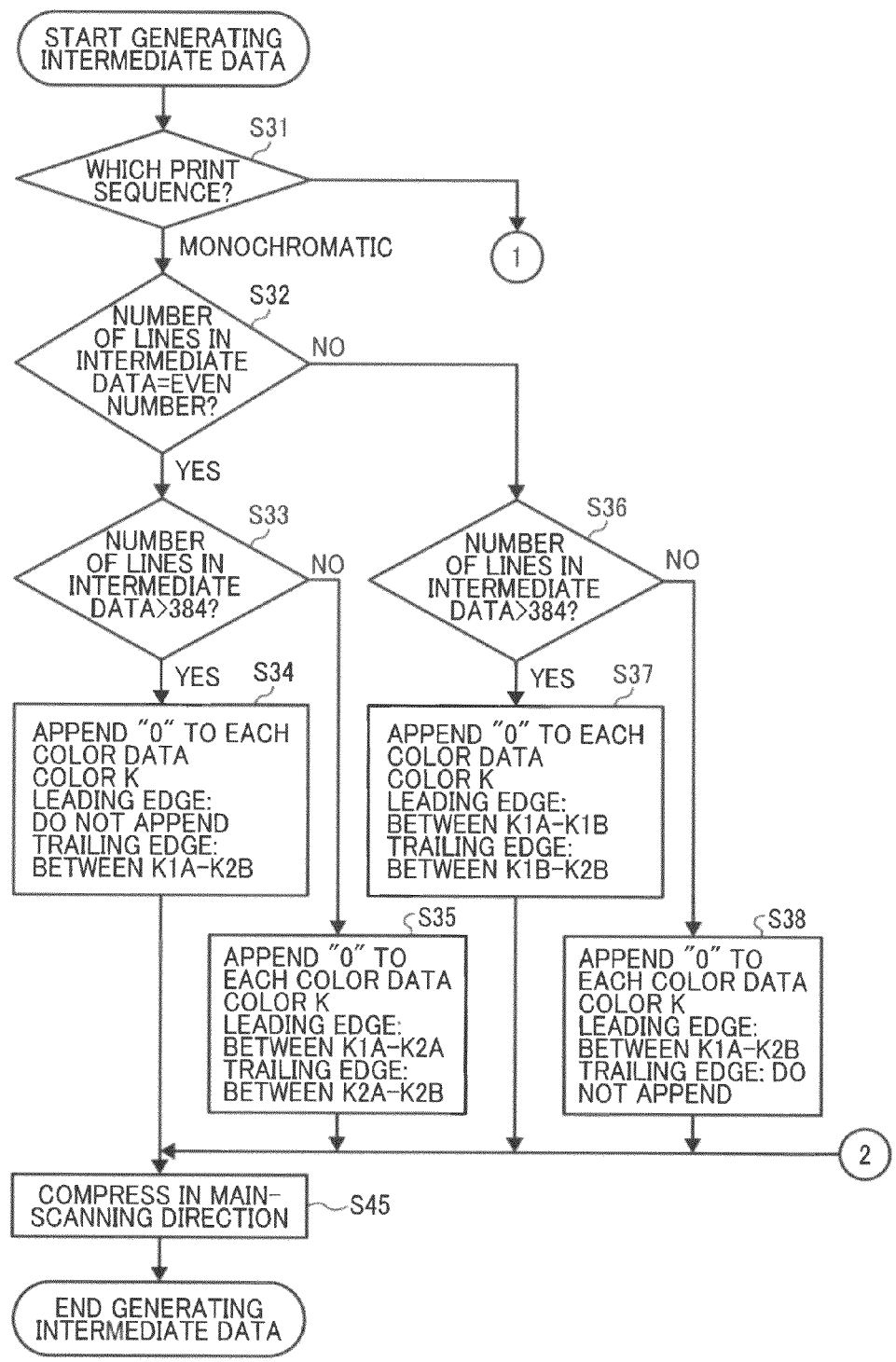
FIGS. 12A and 12B illustrate a flowchart of a detailed process of generating intermediate data.
Figure 12B:
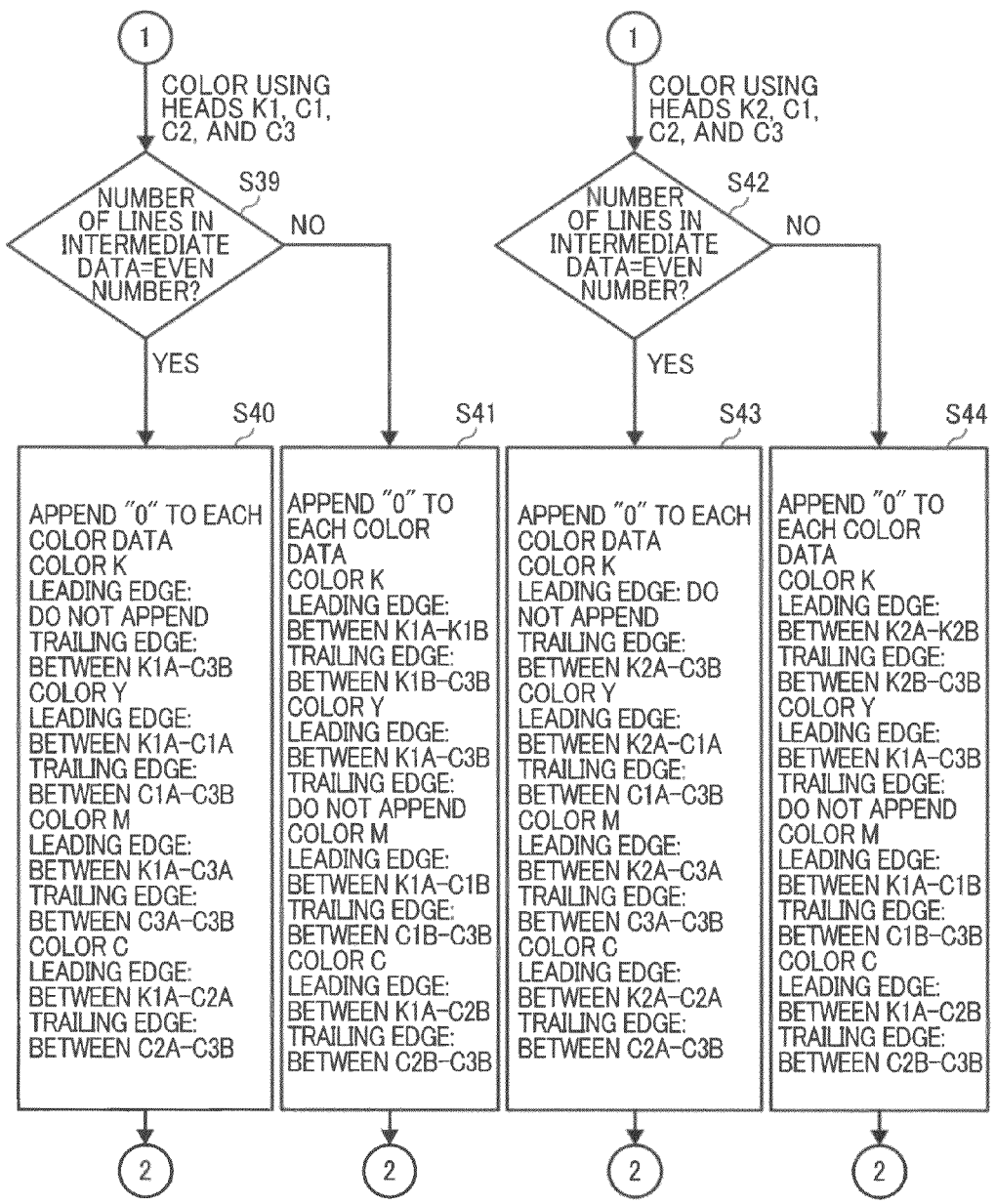

A detailed process of generating intermediate data will now be explained. FIGS. 12A and 12B illustrate a flowchart of the detailed process of the intermediate data generation.

In the embodiment, "0" data, which is an indication of no ink droplet output, is appended to the leading edge and the trailing edge of the intermediate data in the main-scanning direction corresponding to the configuration of the nozzles of the print head. The "0" data is appended to the intermediate data of each of the colors C, M, Y, and K after the data is subjected to the gradation process.

More specifically, the "0" data is appended to the leading edge of the intermediate data of each of the colors C, M, Y, and K in the main-scanning direction corresponding to the distance, in the main-scanning direction, between the first nozzle that arrives at the leading edge of the recording area of a recording sheet in the outward printing and the other nozzle of its color. The "0" data is also appended to the trailing edge of the intermediate data in the main-scanning direction according to the distance, in the main-scanning direction, between the last nozzles to arrive at the trailing edge of the recording area on the recording sheet in the outward printing and the other nozzle of its color.

As explained earlier with reference to FIG. 4, the lines of the storage areas on the memory 120 correspond to the positions of the nozzles on the print head. Therefore, the output nozzle is determined based on the number of lines of the storage areas in which the intermediate data has already been stored, and "0" data is appended corresponding to each nozzle.

Upon starting generating intermediate data, the intermediate data generating unit 254 determines a printing sequence specified in a print request, and further determines if the requested print is either monochromatic print using the head K1 and the head K2, color print using the head K1, the head C1, the head C2, and the head C3, or color print using the head K2, the head C1, the head C2, and the head C3 (Step S31).

If the requested print is monochromatic print, the intermediate data generating unit 254 further determines if the number of lines of the intermediate data to be generated is an even number or an odd number (Step S32). This process is performed to determine to which nozzles the data is to be output based on the fact that the even-numbered lines and the odd-numbered lines in the intermediate data are printed by nozzles in different columns.

The intermediate data generating unit 254 then further determines if the number of lines in the intermediate data is more than 384 (Steps S33 and S36). Such determination is made because, as it can be seen in the nozzle configuration on the print head illustrated in FIG. 3, there are two heads outputting the color K, the head K1 and the head K2, and the intermediate data exceeding 384 lines is output from the head K2. In this manner, the intermediate data generating unit 254 identifies the nozzles to which the data is to be output, alongside with the determination on whether the number of lines is an even number or an odd number.

After identifying the nozzles to which the data is to be output, the intermediate data generating unit 254 appends the "0" data to the leading edge of the K-color intermediate data in the main-scanning direction, in the number of dots corresponding to the distance between the first nozzles to arrive at the leading edge of the recording area on a recording sheet in an outward printing (the nozzles in the column A on the head K1) and the nozzles to which the data is to be output. The intermediate data generating unit 254 also appends "0" data to the trailing edge of the intermediate data in the main-scanning direction, in the number of dots corresponding to the distance between the last nozzles to arrive at the trailing edge of the recording area (the nozzles in the column B on the head K2) and the nozzles to which the data is to be output (Steps S34, S35, S37, and S38).

The intermediate data generating unit 254 then compresses the intermediate data appended with the "0" data in the main-scanning direction (Step S45), and ends the intermediate data generating process.

At Step S31, if the requested print is color printing using the head K1, the head C1, the head C2, and the head C3, the intermediate data generating unit 254 determines if the number of lines in the intermediate data to be generated is an even number or an odd number (Step S39) to determine the nozzles to which the data is to be output.

The intermediate data generating unit 254 then, for data in each of the colors C, M, Y, and K, appends the "0" data to the leading edge of the intermediate data in the main-scanning direction, in the number of dots corresponding to the distance between the first nozzles to arrive at the leading edge of the recording area on a recording sheet in an outward printing (the nozzles in the column A on the head K1) and the nozzles to which the data is to be output. The intermediate data generating unit 254 also appends the "0" data to the trailing edge of the intermediate data in the main-scanning direction, in the number of dots corresponding to the distance between the last nozzles to arrive at the trailing edge of the recording area (the nozzles in the column B on the head C3) and the nozzles to which the data is to be output (Steps S40 and S41). The intermediate data generating unit 254 then compresses the intermediate data appended with the "0" data in the main-scanning direction (Step S45), and ends the intermediate data generating process.

At Step S31, if the requested print is color printing using the head K2, the head C1, the head C2, and the head C3, the intermediate data generating unit 254 determines if the number of lines in the intermediate data to be generated is an even number or an odd number (Step S42) to determine the nozzles to which the data is to be output.

The intermediate data generating unit 254 then, for the data in each of the colors C, M, Y, and K, appends the "0" data to the leading edge of the intermediate data in the main-scanning direction, in the number of dots corresponding to the distance between the first nozzles to arrive at the leading edge of the recording area on a recording sheet in an outward printing (the nozzles in the column A on the head K2) and the nozzles to which the data is to be output. The intermediate data generating unit 254 also appends the "0" data to the trailing edge of the intermediate data in the main-scanning direction, in the number of dots corresponding to the distance between the last nozzles to arrive at the trailing edge of the recording area (the nozzles in the column B on the head C3) and the nozzles to which the data is to be output (Steps S43 and S44). The intermediate data generating unit 254 then compresses the intermediate data appended with the "0" data in the main-scanning direction (Step S45), and ends the intermediate data generating process.

In this manner, it is possible to generate the intermediate data that results in output data that causes all of the nozzles on the print head to start and to stop ejecting ink all at the same time in the printing performed in a single scan of the print head. Therefore, the intermediate data does not need to be managed for each of the nozzles to which the data is to be output, and the memory capacity occupied by the intermediate data can be reduced.

Figure 13:
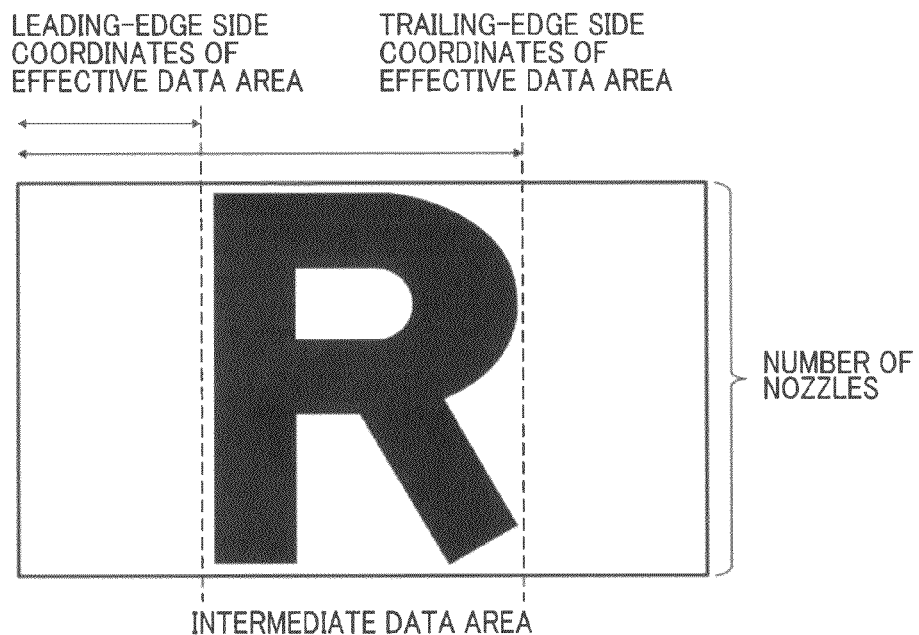
FIG. 13 is a schematic for explaining detection of an effective data area in intermediate data.

A process of detecting an effective data area performed by the effective data area detecting unit 255 will now be explained. FIG. 13 is a schematic for explaining the detection of the effective data area in the intermediate data.

The effective data area detecting unit 255 performs the detection of the effective data area using the intermediate data after the application of the intermediate data generating process explained with reference to FIG. 10 by counting the number of "0" data (no droplet data) in a series located at the leading edge and the trailing edge of the intermediate data in the main-scanning direction for each scan output.

Upon counting, the effective data area detecting unit 255 determines if the data for all of the colors C, M, Y, and K is "0", and notifies the CPU 270 of leading-edge side coordinates of the effective data area determined based on the number of "0" data in a series at the leading edge of the main-scanning direction, and trailing-edge side coordinates of the effective data area determined based on the number of "0" data in a series at the trailing edge, before outputting the data corresponding to a single scan. Based on the setting command, the CPU 270 switches whether or not to output the data outside of the effective area. When no output is selected, the data outside of the effective area in each scan output is discarded before being output.

Because the intermediate data has a data format corresponding to positions of the carriage 281 in the main-scanning direction, the CPU 270 can move the carriage 281 from the leading-edge side coordinates of the effective data area to the trailing-edge side coordinates of the effective data area that are notified by the image processing unit 250 to achieve printing of a single scan. Therefore, printing can be performed with a minimum carriage movement, so that the higher linear velocity can be achieved.

Figure 14:
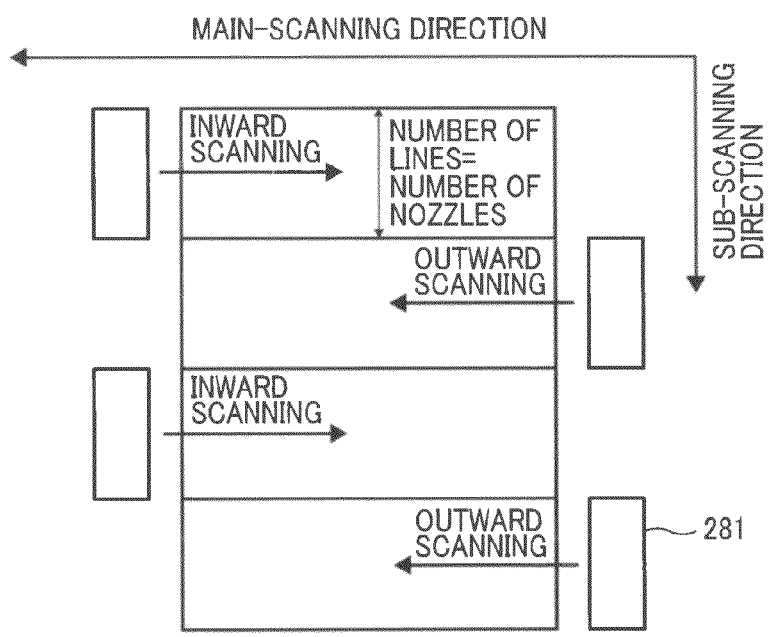
FIG. 14 is a schematic of scans of the print head in bidirectional printing.

A process of generating output data for the bidirectional printing will now be explained. FIG. 14 is a schematic of scans of the print head in the bidirectional printing. The number of sub-scanning lines corresponding to the number of nozzles is printed in a single scan.

After image formation is completed in the outward scanning, the recording sheet P is carried by a distance corresponding to the lines corresponding to the number of nozzles. Printing is then performed in the inward scanning, and the recording sheet P is carried again. The bidirectional printing is achieved by repeating this process.

Figure 15A:
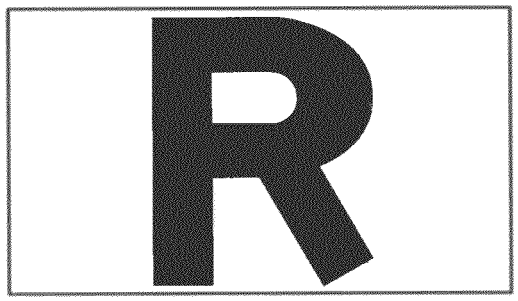
FIGS. 15A to 15C are schematics for explaining a process of converting the image data corresponding to a single scan stored in the storage areas in the memory into a data format corresponding to a scanning direction.
Figure 15B:
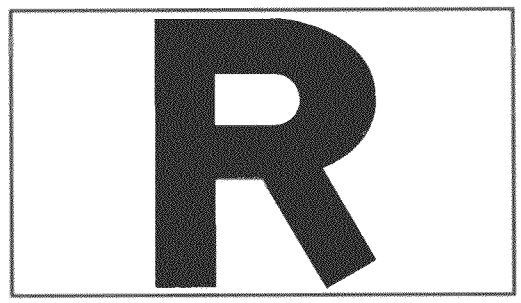
Figure 15C:
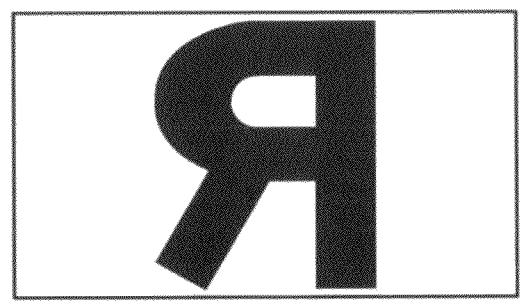

FIGS. 15A to 15C are schematics for explaining a process of converting image data corresponding to a single scan and stored in the storage area in the memory 120 into a data format corresponding to a scanning direction. The output data converting unit 257 converts the image data into the output data in a different manner depending on whether the target scan is an outward scan or an inward scan. When the outward scan and the inward scan are those in the directions illustrated in FIG. 14, the intermediate data to be output in the outward printing is mirrored in the main-scanning direction.

The printing program executed in the printer 100 according to the embodiment may be incorporated in a read-only memory (ROM) or the like in advance.

The printing program executed in the printer 100 according to the embodiment may be recorded in a computer-readable recording medium, such as a compact disk read-only memory (CD-ROM), a flexible disc (FD), a compact disc-recordable (CD-R), and a digital versatile disk (DVD), as a file in an installable or an executable format.

The printing program executed in the printer 100 according to the embodiment may be stored in a computer connected to a network such as the Internet to be made available for downloads via the network. Furthermore, the printing program executed in the printer 100 according to the embodiment may be provided or distributed over a network such as the Internet.

The printing program executed in the printer 100 according to the embodiment has a modular structure comprising each of the modules in the image processing unit 250. In the actual hardware, by causing the CPU (processor) to read the printing program from the ROM and to execute the program, each of the modules is loaded onto the main memory, and the image processing unit 250 is provided on the main memory.

As explained above, according to the embodiment, the intermediate data storing processing unit 256 determines, for each pixel in the input image data, in which scan of the print head the pixel is to be printed based on the printing scheme and the position of the pixel in the input image data, and each pixel in the intermediate data is stored in a different storage area in the memory 120 in a manner corresponding to a scan. Therefore, the number of times the input image data is read from the memory 120 and forwarded is reduced to 1/(number of passes), and in this manner, the processing speed of the rendering process is improved.

According to an aspect of the embodiment of the prevent invention, the processing speed of the rendering process can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A printing apparatus that is an inkjet printing apparatus comprising:
    a print head that includes a plurality of nozzles that eject liquid droplets, and prints output data onto a recording medium in a plurality of scans in a main scanning direction;
    a storage unit including a number of storage areas, the number being determined based on a scheme of the scans;
    an intermediate data generating unit that generates intermediate data corresponding to an image to be output from input image data;
    an intermediate data storing processing unit that determines in which scan of the scans a pixel in the input image data is printed and stores, based on a result of the determining, the generated intermediate data in one of the storage areas corresponding to the scan of the print head; and
    an output data converting unit that converts the intermediate data stored in the storage unit into the output data, and sends the output data to the print head so that the print head prints the image such that an image of one line in the main scanning direction is printed by a plurality of scans using the intermediate data in the storage unit.

2. The printing apparatus according to claim 1, wherein the intermediate data generating unit determines, based on the scheme of the scans and a position of the image to be output with respect to the input image data, in which scan the pixel is to be printed.

3. The printing apparatus according to claim 1, wherein the intermediate data generating unit appends non-ejection data indicating no ejection of the liquid droplets to a leading edge and a trailing edge of each line of the input image data along a main-scanning direction based on an arrangement of the nozzles on the print head, to generate the intermediate data.

4. The printing apparatus according to claim 3, wherein the intermediate data generating unit determines the arrangement of the nozzles for each color component.

5. The printing apparatus according to claim 3, further comprising:
    an effective data area detecting unit that detects an effective data area in the output data based on the number of consecutive pieces of the non-ejection data, wherein
    the output data converting unit sends the output data within the effective data area to the print head.

6. The printing apparatus according to claim 1, wherein:
    the output data converting unit converts the intermediate data stored in the storage unit into the output data, and sends the output data to the print head so that the print head prints the image using at least one of a multipass printing and an interlaced printing.

7. The printing apparatus according to claim 6, wherein:
    the output data converting unit converts the intermediate data stored in the storage unit into the output data, and sends the output data to the print head so that the print head prints the image using the multipass printing.

8. The printing apparatus according to claim 6, wherein:
    the output data converting unit converts the intermediate data stored in the storage unit into the output data, and sends the output data to the print head so that the print head prints the image using the interlaced printing.

9. The printing apparatus according to claim 6, wherein:
    the output data converting unit converts the intermediate data stored in the storage unit into the output data, and sends the output data to the print head so that the print head prints the image using both the multipass printing and the interlaced printing.

10. The printing apparatus according to claim 1, wherein:
the intermediate data generating unit reads the input image data one line by one line and generates the intermediate data.

11. A printing method executed in an inkjet printing apparatus comprising a print head including a plurality of nozzles that eject liquid droplets and prints output data onto a recording medium in a plurality of scans in a main scanning direction, and a storage unit including a number of storage areas, the number being determined based on a scheme of the scans, the method comprising:
generating intermediate data corresponding to an image to be output from input image data;
determining in which scan of the scans a pixel in the input image data is printed and storing, based on a result of the determining, the generated intermediate data in one of the storage areas corresponding to the scan of the print head; and
converting the intermediate data stored in the storage unit into the output data, and sending the output data to the print head so that the print head prints the image such that an image of one line in the main scanning direction is printed by a plurality of scans using the intermediate data in the storage unit.

12. The printing method according to claim 11, wherein:
the converting converts the intermediate data stored in the storage unit into the output data, and sends the output data to the print head so that the print head prints the image using at least one of a multipass printing and an interlaced printing.

13. The printing method according to claim 12, wherein:
the converting converts the intermediate data stored in the storage unit into the output data, and sends the output data to the print head so that the print head prints the image using the multipass printing.

14. The printing method according to claim 12, wherein:
the converting converts the intermediate data stored in the storage unit into the output data, and sends the output data to the print head so that the print head prints the image using the interlaced printing.

15. The printing method according to claim 12, wherein:
the converting converts the intermediate data stored in the storage unit into the output data, and sends the output data to the print head so that the print head prints the image using both the multipass printing and the interlaced printing.

16. A computer program product comprising a non-transitory computer-usable medium having computer-readable program codes embodied in the medium for causing a computer including a print head with a plurality of nozzles that eject liquid droplets and prints output data onto a recording medium in a plurality of scans in a main scanning direction, and a storage unit with a number of storage areas, the number being determined based on a scheme of the scans to execute:
generating intermediate data corresponding to an image from input image data;
determining in which scan of the scans a pixel in the input image data is printed and storing, based on a result of the determining, the generated intermediate data in one of the storage areas corresponding to the scan of the print head; and
converting the intermediate data stored in the storage unit into the output data, and sending the output data to the print head so that the print head prints the image such that an image of one line in the main scanning direction is printed by a plurality of scans using the intermediate data in the storage unit.

17. The computer program product according to claim 16, wherein:
the converting converts the intermediate data stored in the storage unit into the output data, and sends the output data to the print head so that the print head prints the image using at least one of a multipass printing and an interlaced printing.

18. The computer program product according to claim 17, wherein:
the converting converts the intermediate data stored in the storage unit into the output data, and sends the output data to the print head so that the print head prints the image using the multipass printing.

19. The computer program product according to claim 17, wherein:
the converting converts the intermediate data stored in the storage unit into the output data, and sends the output data to the print head so that the print head prints the image using the interlaced printing.

20. The computer program product according to claim 17, wherein:
the converting converts the intermediate data stored in the storage unit into the output data, and sends the output data to the print head so that the print head prints the image using both the multipass printing and the interlaced printing.

* * * * *